United States Patent [19]

Honig

[11] Patent Number: 4,494,640
[45] Date of Patent: Jan. 22, 1985

[54] HYDRAULIC CONTROL DEVICE FOR AN AUTOMATIC TRANSMISSION

[75] Inventor: Ernst-August Honig, Wolfsburg, Fed. Rep. of Germany

[73] Assignee: Volkswagenwerk Aktiengesellschaft, Wolfsburg, Fed. Rep. of Germany

[21] Appl. No.: 457,643

[22] Filed: Jan. 13, 1983

[30] Foreign Application Priority Data

Feb. 13, 1982 [DE]  Fed. Rep. of Germany ....... 3205198

[51] Int. Cl.³ ........................ B60K 41/16; F16D 21/04
[52] U.S. Cl. .............................. 192/0.052; 192/0.092; 74/868; 74/877; 74/871
[58] Field of Search .................. 74/868, 867, 877, 870, 74/871; 192/0.052, 0.055, 0.044, 0.092, 0.094

[56] References Cited

U.S. PATENT DOCUMENTS

| 2,953,940 | 9/1960 | Slemmons | 74/867 X |
| 3,181,386 | 5/1965 | Schaefer | 74/868 |
| 3,273,679 | 9/1966 | Uher | 192/0.055 X |
| 3,580,112 | 5/1971 | Dach | 74/868 |
| 3,656,600 | 4/1972 | Kitano et al. | 192/0.055 |
| 3,738,198 | 6/1973 | Kell | 74/868 |
| 4,126,154 | 11/1978 | McQuinn | 74/868 X |
| 4,248,333 | 2/1981 | Matsumoto et al. | 192/0.052 |
| 4,313,353 | 2/1982 | Honig | 74/868 |
| 4,331,045 | 5/1982 | Piech et al. | 74/867 |

FOREIGN PATENT DOCUMENTS

| 1680646 | 3/1979 | Fed. Rep. of Germany. | |
| 2844665 | 4/1980 | Fed. Rep. of Germany | 74/867 |
| 3019274 | 11/1981 | Fed. Rep. of Germany | 192/0.07 |
| 2387137 | 12/1978 | France | 192/0.055 |
| 5422621 | 2/1979 | Japan | 192/0.044 |
| 5755229 | 4/1982 | Japan | 192/0.07 |

Primary Examiner—George H. Krizmanich
Assistant Examiner—Dirk Wright
Attorney, Agent, or Firm—Braumbaugh, Graves, Donohue & Raymond

[57] ABSTRACT

A hydraulic control device for automatic transmissions of the type where pressurized fluid activates a gear shift element, e.g., a forward clutch, includes a shift valve to selectively interrupt the delivery of pressurized fluid to disengage a gearshift element. The position of the shift valve is determined by an accelerator-pedal-position-dependent pressure, which is delivered through a throttle point and a control valve, preferably the so-called kick-down valve, the latter regulating the delivery of the load-dependent pressure. When the accelerator pedal is released, the control valve vents the fluid line leading to the shift valve, which causes shifting of the shift valve and disengagement of the gearshift element. When the accelerator is again depressed, pressurized fluid is delivered to the shift valve through the throttle point, to re-engage the gearshift element smoothly. However, if the accelerator pedal is depressed beyond a predefined position, the control valve by-passes the throttle, so as to deliver pressurized fluid quickly and re-engage the transmission element without delay.

3 Claims, 1 Drawing Figure

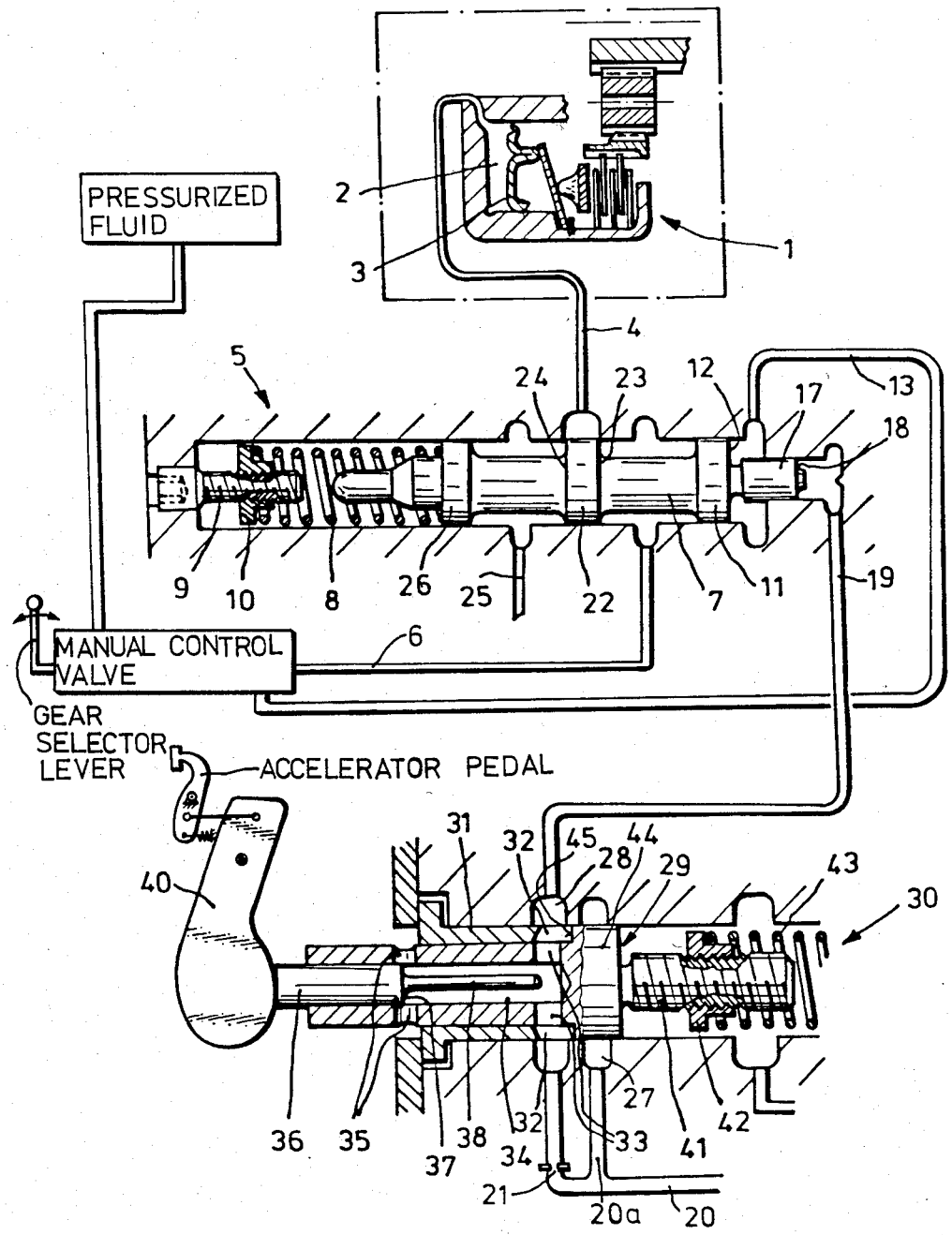

HYDRAULIC CONTROL DEVICE FOR AN AUTOMATIC TRANSMISSION

BACKGROUND OF THE INVENTION

The present invention relates to a hydraulic control device for an automatic transmission in an automobile.

Hydraulic control devices that can prevent creeping movement of a vehicle equipped with a hydrodynamic-mechanical automobile transmission when the engine is idling and a forward gear of the transmission is engaged are known. See, for example, U.S. Pat. No. 4,331,045. The device disclosed in U.S. Pat. No. 4,331,045 has a shift valve which can selectively vent the pressurized fluid line leading to the forward clutch element, so as to disengage the element. The shift valve is actuated by a control valve, which is preferably formed as part of the accelerator kick-down valve, normally present in transmission control systems, to cause the transmission element to disengage when the accelerator pedal is released. The device has a line carrying an accelerator-pedal-position-dependent pressure connected to the shift valve; this line is connected by a throttle point with a pressure line carrying an engine-load-dependent pressure; this line is also connected by the control valve with a pressure medium outlet when the accelerator pedal is released.

The control valve, i.e. the kick-down valve, of the device of U.S. Pat. No. 4,331,045 has a control piston which is disposed within a bore of the piston of the kick-down valve. The bore is connected with the line leading to the shift valve. The control piston can be displaced within normal play associated with the idling position of the accelerator. When the accelerator is released, the control piston connects the bore with the outlet to vent the line leading to the shift valve. When the accelerator is depressed slightly, the control valve is pushed into the bore so as to block the outlet.

When the accelerator is depressed, a slight delay occurs before the shift valve shifts to re-engage the transmission. This delay occurs due to the time necessary to fill the hydraulic lines leading to the shift valve with pressurized fluid. As noted above, the pressurized fluid is delivered by way of a throttle point. Under normal restarting, when the accelerator is depressed moderately, i.e. below a definite depressing velocity, this known hydraulic control device operates satisfactorily. Any delay in re-engagement of the transmission element occurs while the throttle is still in its idling position, or at most is very slight, and thereby does not delay the initiation of forward movement of the vehicle in a remarkable way. However, if the accelerator pedal is depressed rapidly and comparatively strongly after a period during which it was released, a greater delay will occur before the gearshift element re-engages. This phenomenon is due to the fact that when the kick-down piston of the control valve is actuated, there is an increase in the space that must be filled with a pressure medium from the pressure line, and the space is filled relatively slowly through the throttle point in the pressure line. Consequently, the pressure required to move the shift valve to a position to re-engage the transmission builds up only with some delay in the line leading to the shift valve, and this can delay the start of forward vehicle movement.

SUMMARY OF THE INVENTION

A hydraulic control device for an automatic transmission in accordance with the invention ensures that a sufficiently early re-engagement of the gearshift element of the transmission is achieved in the event that the accelerator pedal is actuated rapidly out of its rest position beyond a predefined position.

More particularly, a hydraulic control device for an automatic transmission, which has a mechanical planetary gearing system with hydraulically actuatable gearshift elements for selective engagement of transmission elements In such a transmission, a manual control valve, whose positions depend upon the position of a manually actuatable selector lever, conveys pressurized fluid for actuation of a gearshift element when the selector lever is positioned in a forward gear. Also, a pressure medium line communicates between the manual control valve and the gearshift element.

In accordance with the invention, the hydraulic control system includes a shift valve with a piston, a fluid line, and a control valve, which is preferably the so called kick-down valve normally provided in automobiles. The shift valve is arranged in the pressure medium line and selectively interrupts the delivery of pressurized fluid to the gearshift element, for disengaging the forward clutch of the transmission. The piston of the shift valve controls the delivery of the pressurized fluid to the gearshift element. The piston is acted upon in one direction by a return spring and in an opposite direction by an accelerator-pedal-position-dependent pressure, preferably hydraulic. The fluid line delivers a fluid with an accelerator-pedal-dependent pressure to the shift valve so that the fluid acts on the piston of the shift valve. The fluid line is connected through a throttle point with a pressure line carrying an engine-load-dependent pressure. A control valve is arranged in the fluid line and is actuatable by the accelerator pedal. The control valve vents the fluid line when the accelerator pedal is released and directly connects the fluid line with the pressure line, bypassing the throttle point, when the acelerator pedal is actuated beyond a predefined position.

In a hydraulic control device for an automatic transmission in accordance with the invention, if the accelerator pedal is actuated rapidly out of its rest position beyond a predefined position, the control valve connects the fluid line leading to the shift valve directly with the pressure line, bypassing the throttle point. Pressure admission to the fluid line leading to the shift valve occurs comparatively rapidly without any substantial delay. When the accelerator is in its rest position, however, the fluid line leading to the shift valve is connected with the pressure line only through the throttle point, not directly connected, so that, when the accelerator pedal is in this position, the throttle point prevents a pressure drop in the engine-load-dependent pressure that is present in the pressure line upstream of the throttle point.

In a preferred embodiment of the invention, the control valve has a pressure connection that can be directly connected to the pressure line through a branch line that bypasses the throttle point. When the accelerator pedal is released or only partially depressed, the pressure connection to the branch line is closed by a piston collar of the piston valve of the control valve. When the accelerator pedal is actuated beyond a predefined position, a control edge of the piston opens to the branch line to connect the pressure line directly with the fluid line leading to the shift valve.

For a better understanding of the invention, reference is made to the following detailed description of a preferred embodiment taken in conjunction with the accompanying drawing.

BRIEF DESCRIPTION OF THE DRAWING

FIG. 1 is a schematic longitudinal cross section of an embodiment of a hydraulic control device for an automatic transmission in accordance with the invention.

DETAILED DESCRIPTION OF THE PREFERRED EMBODIMENTS

In FIG. 1, a gearshift element 1, e.g., a forward clutch, is associated with the forward gears of a hydrodynamic-mechanical automobile transmission. The gearshift element 1, which is part of a mechanical planetary gearing system and hydraulically actuatable, has a pressure admission space 2 and an actuation piston 3. The pressure admission space 2 is connected with a pressure medium admission line 4, which is connected with a pressure medium line 6 coming from a manual control valve. The manual control valve is controlled by a conventional gear selector lever. The connection between the pressure medium admission line 4 and the pressure medium line 6 is controlled as a function of the position of the accelerator pedal of the vehicle and, optionally, the speed of travel, by a shift valve 5. The pressure medium line 6 carries main pressure, which is supplied by a source of pressurized fluid, in all forward gears when one of the forward drive positions is engaged by the gear selector lever. The source of pressurized fluid supplies the pressure medium line 6 with the highest pressure used in the transmission control system, which is conventionally generated by a gear pump (not shown) and regulated as a function of the engine load by a main pressure control valve (not shown), through the manual control valve.

The shift valve 5 has a piston 7 that is loaded by a spring 8 acting on a piston collar 26. The spring force of the spring 8 can be adjusted by means of a spring retainer 10, which can be positioned by an adjustment screw 9. The spring force of the spring 8 is opposed by an essentially accelerator-pedal-dependent pressure, which is conveyed to an end face 18, shown on the right in FIG. 1, of a piston collar 17 of the piston 7 through a line 19. A pressure is conveyed through a pressure medium line 13 to a second active surface 12 of a piston collar 11 of the piston 7. The pressure in the pressure medium line 13, like the accelerator-pedal-dependent pressure in the line 19, opposes the spring force of the spring 8. The pressure medium line 13 may be connected to the manual control valve in such a manner that it carries main pressure when the selector lever, which conventionally has at least the positions "1," "2," and "D," is in the "2" or "1" position. Line 13 may also be connected to a source of vehicle-speed-dependent pressure.

The piston 7 is displaced from its center position, which is shown in FIG. 1, either to the left or to the right as a function of the spring and pressure forces acting on it. When it is displaced, control edges 23 and 24 provided on a piston collar 22 connect the pressure medium admission line 4 leading to the gearshift element 1 either with the pressure medium line 6 or with a pressure medium outlet 25. The pressure medium admission line 4 is connected with the pressure medium outlet 25, at which time the forward clutch 1 disengages, only if the spring force of the spring 8 is larger than the force acting on the active surface of the end face 18 of the piston 7 due to the accelerator-pedal-position-dependent pressure plus, possibly, the force acting on the annular active surface 12 of the piston 7 due to the pressure in the pressure medium line 13. The magnitude of the spring force of the spring 8 and the size of piston surfaces 12 and 18 are designed in such a manner that the spring force of the spring 8 is predominant only if no main pressure is present in the line 13 and the line 19 is vented. However, since the line 13 carries main pressure when the selector lever is in the "2" or "1" position, the shift valve 5 is in the position for engaging the gearshift element 1 when the selector lever is in the "2" or "1" position. In this case, the forward clutch 1 cannot be disengaged even if the accelerator pedal is released. The forward clutch 1 can disengage only if the selector lever of the transmission is in its continuous travel position, i.e., the "D" position, and the accelerator pedal is released i.e., is in the rest or idling position.

A control valve 30 ensures that when the accelerator pedal is released, the line 19, which is connected through a throttle point 21 with a pressure line 20 that carries an engine-load-dependent pressure, is fully vented through connection with a pressure medium outlet.

Towards this end, a piston or piston valve 29 of the control valve 30, which is also called a kickdown valve and provided in commonly known transmission control systems and actuated by an actuation lever 40 that is connected with the accelerator pedal, is provided with a control piston 36. The control piston 36 is displaceable in a longitudinal bore 34 over a free movement path that is associated with the idling position of the accelerator pedal. The longitudinal bore 34 is connected by transverse bores 33 and end face clearances 32 of a guide bushing 31, which is provided for stop limitation of the piston collar 44 of the piston 29, with a housing pocket 28. The housing pocket 28 is connected, on one side, with the line 19, and, on the other side, with the pressure line 20 through the throttle point 21.

The longitudinal bore 34 is provided with transverse bores 35, which function as pressure medium outlets. The connection between the transverse bores 35 and the line 19 is controlled by an end face control edge 37 of the control piston 36. The piston 29 of the kickdown valve is connected with a known pressure valve (not shown) that delivers pressurized hydraulic fluid to the pressure line 20. The piston 29 is pushed to the left in FIG. 1 by a spring 43, which acts on a spring plate 42 that is displaceable on a threaded bar 41 of the piston 29. The spring 43 urges the piston 29 against the guide bush 31, which acts as stop for the piston.

When the accelerator pedal, i.e., the actuation lever 40, is in its released position, which is shown in FIG. 1, the control piston 36 is displaced by the pressure built up in the line 19 through the throttle point 21 so far to the left that the transverse bores 35 constituting the pressure medium outlets are open. The line 19 is then connected through the clearances 32 of the guide bush 31, the transverse bores 33 of the piston valve 29, and the longitudinal bore 34 with the transverse bores 35, so that the pressure medium can be discharged there, and the pressure in the line 19 can drop to approximately atmospheric pressure.

When the accelerator pedal is in its released position, the throttle point 21 in the connection to the pressure line 20 prevents the pressure in the pressure line 20 from dropping to atmospheric pressure. Rather, the pressure in the pressure line 20 remains on a raised level, namely, the idling pressure.

When the line 19 is vented and there is no pressure in the line 13, the piston 7 of the shift valve 5 is pushed by the spring 8 to the right in FIG. 1, so that the pressure medium admission line 4 is connected over the piston step provided between the piston collars 22 and 26 with the pressure medium outlet 25. As a result, the pressure admission chamber 2 of the forward clutch 1 is vented, and the clutch is disengaged. The nonpositive connection between the turbine wheel of the torque converter (not shown) and the vehicle wheels (not shown) is thereby interrupted. Consequently, while the vehicle is stopped and idling, creeping does not occur; moreover, since the drive wheels are disconnected from the engine, the vehicle can coast, while the vehicle is moving, during overrun operations, in which the accelerator pedal is released, the kinetic energy of the vehicle mass driving the vehicle, without any braking action by the engine.

The forward clutch 1 is re-engaged only when the accelerator pedal has overcome the free travel associated with its idling position. When this occurs, the control piston 36 is moved to the right in FIG. 1 until a stop pin 38 of the control piston 26 meets the end of the longitudinal bore 34, which, as shown, may have a frusto-conical receiving recess, or until the lever 40 meets the end face of the piston 29, whereby the control edge 37 closes the transverse bores 35. When this occurs, the pressure in the pressure line 20 causes the pressure in the line 19 to build up. With the transverse bores 35 closed, the idling pressure delivered from line 20 to line 19 through the throttle point 21 is sufficient to displace the piston 7 of the shift valve 5 to the left for connection of the pressure medium admission line 4 with the pressure medium line 16. Therefore, the pressure medium outlet bores 35 are closed by the control edge 37 of the control piston 36 even before the accelerator pedal is actuated out of its idling position for acceleration of the vehicle engine.

However, when the accelerator pedal is rapidly displaced beyond a predefined position, the piston valve 29 of the control valve 30 is displaced to the right in FIG. 1. Movement of the piston 29 away from bushing 31 increases the volume of space that must be filled with the pressure medium, i.e. the space on the left side of the piston collar 44. Accordingly, without a branch line 20a of the pressure line 20 to bypass the throttle point 21, the pressure in the line 19 would build up with a comparatively large delay and would, in turn, lead to a delayed re-engagement of the forward clutch 1. The more the accelerator pedal is depressed, the larger the increase in volume between piston shoulder 44 and bushing 31, and thereby the longer the delay in re-engagement. Such a delay would be in direct opposition to the intentions of the vehicle operator who, by actuating the accelerator pedal forcefully, wishes to cause the engine to drive the vehicle again quickly. However, the branch line 20a, which is connected with a housing pocket 27, ensures that upon actuation of the accelerator pedal beyond a predefined position, the line 19 is directly connected with the pressure line 20 through the branch line 20a, thereby bypassing the throttle point 21. In the rest position of the accelerator pedal, which is shown in FIG. 1, the piston collar 44 closes off the housing connection opening 27 and prevents a direct connection of the line 19 with the branch line 20a. A control edge 45, which is on the left end face of the piston collar 44, opens the connection between the line 19 and the branch line 20a and the pressure line 20, respectively, when the accelerator pedal is displaced beyond a predefined position. Consequently, even if the accelerator pedal is actuated very rapidly and forcefully, the pressure in the line 19 builds up rapidly, and the forward clutch re-engages rapidly, too.

The above described embodiments of the invention are merely illustrative. Variations and modifications will be apparent to those skilled in the art without departing from the inventive concept disclosed herein. For example, in the line 19 leading to the shift valve 5 for the gearshift element 1, another control valve that depends upon the brake pedal position could be provided, as disclosed in U.S. Pat. No. 4,313,353. Also, shift valve 5 could be designed so that it is actuated as a function of the speed of the vehicle, so that it would permit the element 1 to disengage only within defined speed ranges. All such variations and modifications are intended to be within the scope of the present invention as defined by the following claims.

I claim:

1. In an automatic transmission of an automobile having a mechanical planetary gearing system with hydraulically actuatable gearshift elements for selective engagement of transmission elements; a manual control valve having positions depending upon the position of a manually actuatable selector lever, said manual control valve conveying pressurized fluid for actuation of said gearshift element when said selector lever is positioned for a forward gear, and a pressure medium line communicating between said manual control valve and said gearshift element;

a hydraulic control device comprising:

a shift valve means arranged in said pressure medium line for selectively interrupting the delivery of said pressurized fluid, said shift valve means comprising a piston, said piston controlling the delivery of said pressurized fluid to said gearshift element and being acted upon in one direction by a return spring and acted upon in an opposite direction by a pressure depending upon the position of an accelerator pedal;

a fluid line for delivering pressurized fluid to said piston, for imparting said pressure depending upon the position of an accelerator pedal, said fluid line being connected through a throttle point with a pressure line carrying an engine load-dependent pressure; and a control valve means, arranged in said fluid line and actuatable by said accelerator pedal, for venting said fluid line when said accelerator pedal is released, and for connecting said fluid line directly with said pressure line, for bypassing said throttle point, when said accelerator pedal is actuated beyond a predefined position.

2. A hydraulic control device according to claim 1 wherein said control valve means includes a control piston and a piston valve, said control piston being actuatable by said accelerator pedal and displaceable in a longitudinal bore of said piston valve, said control piston having a control edge, said control edge arranged to open a connection between said fluid line and a pressure medium outlet when said accelerator pedal is released and to close said connection when said accelerator pedal is actuated.

3. A hydraulic control device according to claim 2, wherein said control valve means includes a branch line connected to said pressure line and bypassing said throttle point, and a pressure connection means for directly connecting said fluid line with said branch line; said pressure connection means being closed by a piston collar of said piston valve when said accelerator pedal is released and connecting said branch line and said fluid line, by a control edge of said piston valve, when said accelerator pedal is actuated beyond a predefined position.

* * * * *